United States Patent [19]
Shimizu et al.

[11] Patent Number: 5,869,209
[45] Date of Patent: Feb. 9, 1999

[54] HOLOGRAM RECORDING APPARATUS AND METHOD

[75] Inventors: Isao Shimizu, Ibaraki; Takahiro Saito, Tokyo; Takashi Isago, Mito, all of Japan

[73] Assignee: Advanced Technology Research Corporation, Ibaraki, Japan

[21] Appl. No.: 740,668

[22] Filed: Oct. 31, 1996

[30] Foreign Application Priority Data

Nov. 1, 1995 [JP] Japan ..... 7-306393
Nov. 14, 1995 [JP] Japan ..... 7-318481

[51] Int. Cl.$^6$ ..... G03H 1/04
[52] U.S. Cl. ..... 430/1; 430/2; 430/41; 359/35; 359/3; 356/256; 248/298.1; 248/228.6
[58] Field of Search ..... 248/288.1, 288.6; 349/823, 822, 6, 827, 896, 503; 356/256; 430/1, 2, 41; 359/35, 3, 6

[56] References Cited

U.S. PATENT DOCUMENTS

| | | | |
|---|---|---|---|
| 2,803,986 | 8/1957 | Choiniere et al. | 248/298.1 |
| 3,655,257 | 4/1972 | Urbach | 430/1 |
| 3,918,969 | 11/1975 | Goffe | 430/41 |
| 5,291,321 | 3/1994 | Noh | 359/30 |
| 5,552,882 | 9/1996 | Lyons et al. | 359/35 |

FOREIGN PATENT DOCUMENTS

| 2029717 | 12/1971 | Germany. |
|---|---|---|
| 63-266479 | 11/1988 | Japan. |

OTHER PUBLICATIONS

Hackh's Chemical Dictionary, Third Ed., p. 283, 1944.
Saito, T. et al., "Solvent Vapour Method in Thermoplastic Photoconductor Media," *J. Optics (Paris)* 1980, vol. 11, n° 5, pp. 285–292.
Shimizu, I. et al., "Developmental research on simultaneous discrimination of shapes by a photoconductor–plastic hologram automatically processed by solvent vapour," *SPIE* (1996) vol. 2774/171–176.
Pasco Scientific 1972 Catalog (May 1972).
Beckman & Whitley, Inc. Catalog (Feb. 1965).
Shoemaker et al. "Experiments is Physical Chemistry" © 1981, pp. 200–202.
"An Improved Technique for Holographic Recording on Thermoplastic–Photoconductor (II)" by T. Saito, T. Honda and J. Tsujuichi, pp. 44–48, vol. 23, No. 1, Optics Communications, Oct. 1977.
"A photoconductor and Plastic–Photosensitive Material for Holography", by Takahiro Saito, pp. 219–222, vol. 47, No. 3, Oyo–Butsuri, 1978. (untranslated).

(List continued on next page.)

*Primary Examiner*—Martin Angebranndt
*Attorney, Agent, or Firm*—Morrison & Foerster LLP

[57] ABSTRACT

A hologram recording plate, which has a plastic layer (a rosin derivative) that undergoes frost deformation by being acted upon by a solvent vapor, is set in a developing box supplied with a solvent vapor (cyclohexane) from a solvent vapor reservoir. The solvent vapor is exhausted from the developing box by a suction device. This is followed by subjecting the hologram recording plate to a high voltage from a high-voltage power supply and irradiating the plate with laser light, which represents a hologram to be formed, by opening a light shutter. This makes it possible to reduce the size of and to automate the hologram producing apparatus. The developing box and optical elements inclusive of a light source are secured to respective ones of individual carriers, and the carriers are provided so as to be free to be moved along an optical system aligning rail and fixed to the rail. A very simple and precise optical system can be constructed without using an optical bench or table having a vibration-proof structure.

11 Claims, 9 Drawing Sheets

OTHER PUBLICATIONS

"Microscopic Response in Thermoplastic–Photoconductor Media (Edge Effect)" by T. Saito, N. Shibata, T. Honda and J. Tsujiuchi, pp. 73–78, vol. 9, No. 2, Optics (Paris), 1978.

"An Improved Technique for Holographic Recording on a Thermoplastic Photoconductor" by T. Saito, S. Oshima, T. Honda and J. Tsujiuchi, pp. 90–95, vol. 16, No. 1, Optics Communications, Jan. 1976.

"An Improved Technique (PLA method) for Holographic Recording on Thermoplastic Photoconductor" by Takahiro Saito, Toshio Honda and Jumpei Tsujiuchi, pp. 283–288, SPSE–SPIE Tokyo Symposium, 1977.

"Solvent Vapour Processing of Photoconductor–Plastic Holograms" by Takahiro Saito, Toshio Honda and Jumpei Tsujiuchi, pp. 120–126, vol. 6, No. 3, Kogaku, Jun. 1977.

"Microscopic Response in Thermoplastic Photoconducctor Media (Behavior of Charge Carriers)" by T. Saito, T. Imamura, T. Honda and J. Tsujiuchi, pp. 325–331, vol. 9, No. 6, J. Optics (Paris), 1978.

"Thermoplastic Photographic Material for Vibration Measurements by Speckle Photography" by Sadayuki Ueha et al., pp. 340–344, vol. 34, No. 3, Optics Communications, Sep. 1980.

"Solvent Vapour Method in Thermoplstic Photoconductor Media" by T. Saito, T. Imamura, T. Honda and J. Tsujiuchi, pp. 285–292, vol. 11, No. 5, J. Optics (Paris), 1980.

"A Thermoplastic–Photoconducctor as a Photosensitive Material for Hologram", by Takahiro Saito and Toshio Honda, pp. 48–50, vol. 10, No. 1, Kogakui, Feb. 1981. (untranslated).

"Solvent Vapour Method and Heating Method in Thermoplastic Photoconductor Hologram" by Takahiro Saito, pp. 24–33, vol. 19, No. 2, Denshi Shashin Gakkai–Shi, 1981.

"A Plastic–Photoconductor–Photosensitive Material for Recording Hologram", by Takahiro Saito, pp. 78–85, O plus E, May 1981. (untranslated).

"Enhancement of Sensitivity by Stratifying a Photoconductor on Thermoplstic–Photoconductor Media" by T. Saito, T. Imamura, T. Honda and J. Tsujiuchi, pp. 49–58, vol. 12, No. 1, J. Optics (Paris), 1981.

"Developmental Research on Simultaneous Discrimination of Shapes by Using a Hologram Made Easily and Automatically by Photoconductor–Plastic Processed by Solvent Vapor" by I. Shimazu et al., pp. 95–98, 26th Gazo–Kogaku Conference Ronbun–Shu, Tokyo, Dec. 6–8, 1995.

"Developmental Research on Simultaneous Discrimination of Shapes by a Photoconductor–Plastic Hologram Automatically Processed by Solvent Vapour" by Isao Shimizu et al., Proc. of International Conference on Optical Systems Design and Production II, May 1996.

"Quantitative Flow Visualization of Velocity Distributions by Parallel Image Processing Using PPH (Photo–Conductor Plastic Hologram)" by Takashi Isago and Hiroyuki Taki, pp. 21.4.1, Eighth International Symposium on Application on Laser Techniques to Fluid Mechanics, vol. 11, Lisbon, Portugal, Jul. 8–11, 1996.

Gaertner Scientific Corp. Bullitin No. 156–168D, Jun. 1969.

Newport Research Corp. 1977–1978 Catalog pp. 33–46, 1978.

HOLOGRAM RECORDING APPARATUS AND METHOD

BACKGROUND OF THE INVENTION

1. Field of the Invention

This invention relates to a hologram recording apparatus and method for producing a hologram for the purpose of instantaneously recognizing the minute vibration of an object and a change in the shape of the object, as well as patterns and characters, and for various other purposes as well. The invention further relates to an apparatus to which the above-mentioned apparatus and method are applied, an example of which is a unit for constructing an optical system necessary in laser applications technology, e.g., creation of holograms, recognition of object shape, recognition of character strings, interferometry experiments and diffraction experiments. More specifically, the unit is an apparatus for laying out and aligning the optical elements that construct the optical system. A method for this purpose is also provided.

2. Description of the Related Art

A so-called photographic plate and a photoconductor/thermoplastic hologram photographic plate are available as photosensitive photographic plates for holography. The former is obtained by coating a transparent supporting body (a glass substrate or the like) with silver halide photosensitive material used in photography. The latter is obtained by building up a transparent electrically conductive layer, a photoconductive layer which includes poly-N-vinylcarbazole and a thermoplastic resin layer on a transparent supporting body in the order mentioned.

A method of producing a hologram using a photographic plate involves irradiating a silver halide photosensitive material, which has been applied to the photographic plate, with reference light rays and light rays that have been reflected or transmitted by an object irradiated with laser light, and then developing the plate.

Though a high sensitivity is achieved with this method, the maximum diffraction efficiency is low (The larger the value of diffraction efficiency, the better the quality of the reproduced image obtained). In addition, it is necessary that the photographic plate be removed and developed in darkroom after exposure. The developing treatment is inconvenient as it requires the use of a troublesome process. Once the photographic plate has been removed for development, it is difficult to accurately return the hologram to its original position. As a result, real-time hologram interference cannot be achieved.

A hologram recording method (a method relying upon a thermoplastic) using a photoconductor/thermoplastic hologram photographic plate utilizes frost deformation of a thermoplastic resin. This method includes charging the thermoplastic resin, then softening the thermoplastic resin by high-frequency heating while irradiating the thermoplastic resin with reference light rays and light rays that have been reflected or transmitted by an object irradiated with laser light, and recording the interference fringes. This method has various advantages such as a high diffraction efficiency, spontaneity and reversibility.

However, it is difficult to control the optimum heating temperature and optimum heating time of the thermoplastic resin, and there are problems in terms of expansion and contraction of the substrate and deterioration of the resin layer due to repeated use. Moreover, this method requires a large high-frequency heating apparatus to thermally fuse the thermoplastic resin. It is difficult to reduce the size of the apparatus. Another drawback is that the problem of thermal strain, which influences the performance of the hologram, cannot be avoided.

On the other hand, in order to perform experiments regarding image formation by lenses and optical interference, and experiments and research regarding hologram creation, not only the light source but also such optical elements as lenses and beam splitters must be arranged and fixed along the necessary optical path. The optical system is susceptible to vibration, and even slight positional displacement of the optical elements can cause the optical path to become misaligned, in which case the optical elements must be realigned.

The conventional practice is to arrange the optical elements on an optical bench or isolation table adapted to resist vibration, and to assemble the optical system in two dimensions. Since the optical bench or isolation table is costly and heavy, the apparatus must be set up in a special laboratory, thus making it impossible to perform optical experiments in simple fashion.

SUMMARY OF THE INVENTION

An object of the present invention is to provide a hologram recording apparatus that can be reduced in size and automated as well.

Another object of the present invention is to provide a hologram recording method that utilizes this apparatus.

Still another object of the present invention is to provide an apparatus and method through which a hologram can be recorded and reproduced in the state in which the holograph photographic plate was originally set.

A further object of the present invention is to provide a method and apparatus through which a hologram having a high diffraction efficiency can be produced.

A further object of the present invention is to provide an optical unit in which the conventional optical bench is not required, thereby making it possible to assemble a precise optical system having a very simple structure.

Yet another object of the present invention is to provide a method of placing optical elements without use of the conventional optical bench, thereby making it possible to form a precise optical system in very simple fashion.

Yet another object of the present invention is to provide an optical system for hologram creation, this being one application of the optical unit mentioned above.

A hologram recording apparatus according to the present invention has a developing box, a high-voltage application device, a solvent-vapor generating device, a suction device, a light shutter device and a control device.

The developing box is for holding a hologram recording plate in a freely attachable and detachable manner, the hologram recording plate having a plastic layer which undergoes frost deformation owing to the action of solvent vapor.

The high-voltage application device is for applying a high voltage to the hologram recording plate supported in the developing box.

The solvent vapor generating device generates a solvent vapor that is made to act upon the hologram recording plate supported in the developing box, and feeds the generated solvent vapor into the developing box.

The suction device exhausts the solvent vapor that has been fed into the developing box.

The light shutter device controls the irradiation of the hologram recording plate with laser light from a laser light source.

The control device controls the solvent vapor generating device, suction device, light shutter device and high-voltage application device in such a manner that the following process periods are implemented in a predetermined sequence: a solvent acting period in which the solvent vapor is made to act upon the hologram recording plate, an exhaust period in which the solvent vapor is exhausted from the developing box, an exposure period in which the hologram recording plate is irradiated with laser light, and a charging period in which high voltage is applied to the hologram recording plate.

The hologram recording apparatus according to the present invention utilizes the fact that the plastic layer of the hologram recording plate undergoes frost deformation owing to the application of a certain type of solvent vapor without relying upon the application of heat.

With the hologram recording apparatus described above, various devices can be deployed or connected with the developing box lying at the center. This makes it possible to reduce the overall size of the apparatus. Further, since the control device controls the operation of each device in accordance with a predetermined sequence, construction of the hologram can be automated.

An arrangement may be adopted in which some or all of the functions of the control device are deleted, with those devices corresponding to the deleted functions being manipulated manually.

The hologram recording plate supported in the developing box can be utilized in holograph reconstruction as is, i.e., in situ.

In a preferred embodiment, the control device performs control in such a manner that the exhaust period starts prior to end of the solvent acting period and continues for a predetermined period of time after the end of the solvent acting period, and in such a manner that the exposure period and charging period start after the exhaust period ends.

Since the exhausting of the solvent from the developing box is continued even after the end of the solvent acting period, almost all of the solvent can be exhausted from the interior of the developing box. This hastens and completes the process through which the hologram is fixed on the plastic layer of the hologram recording plate.

A desirable combination of the plastic layer formed on the hologram recording plate and the solvent are a rosin derivative for the plastic layer and cyclohexane or n-hexane for the solvent. Such a combination makes it possible to produce a hologram exhibiting a high diffraction efficiency.

In an optical unit according to this invention, a plurality of optical elements inclusive of a light source are fixed on respective individual carriers and the carriers are provided in such a manner that they are free to move along and capable being secured to a rail for laying out an optical system.

The optical unit also serves as laboratory equipment for laser applications technology.

A method of arranging optical elements according to the present invention involves providing a plurality of carriers free to move along and capable of being secured to a rail for laying out an optical system, and a plurality of optical elements inclusive of a light source fixed individually to respective ones of the carriers.

In accordance with the present invention, a plurality of carriers free to move along and capable of being secured to a rail for laying out an optical system are provided, and optical elements which include a light source are placed on the carriers. As a result, the optical elements are arranged substantially linearly and the spatial relationship among them is fixed merely by the rail. Accordingly, the optical relationship of the optical system is maintained by the rail without using the optical bench or isolation table having the vibration-proof structure of the prior art. The optical relationship of the optical system can be maintained stably even if there is some vibration. The optical system can be moved together with the rail, and the optical system is not adversely affected even if the rail is tilted slightly.

The optical unit according to the invention can be utilized to assemble various optical systems for optical diffraction experiments, experiments in interferometry, experiments on the production of holograms, optical character recognition, etc.. Moreover, since the optical unit is simple in structure, it can be provided at low cost and is an ideal teaching aid for use in schools.

In an optical system for producing a hologram according to the present invention, a laser light source, a beam-shaping optical system for enlarging the beam diameter of and collimating laser light emitted by the laser light source, a beam-splitter optical system for splitting laser light, which has been shaped by the beam-shaping optical system, into two light beams, an interference optical system for making these two light beams interfere as a reference light beam and an object light beam, and a hologram producing device for fixing interfering light, which has been produced by the interference optical system, on a hologram recording plate are secured to respective individual carriers and the carriers are provided so as to be free to move along a rail for laying out an optical system, and so as to be capable of being fixed to the rail.

All of the optical systems needed to produce a hologram are placed on a single rail so that it is possible to unify the optical systems for hologram creation.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Embodiments of the present invention will now be described in detail with reference to the drawings.

Figure 1:
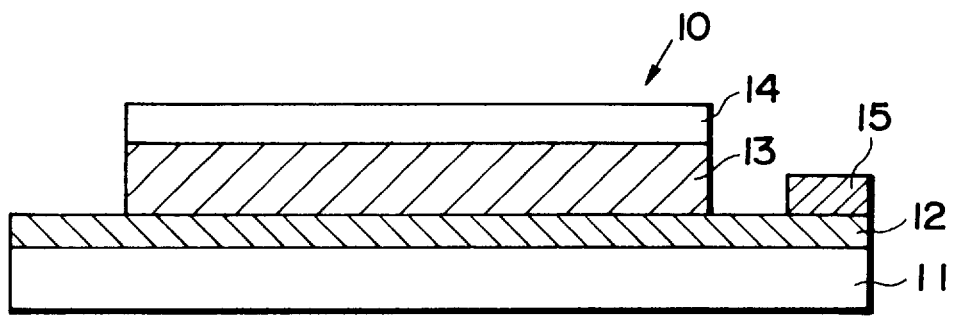
FIG. 1 is a sectional view illustrating a hologram recording plate.

FIG. 1 illustrates the structure of a hologram recording plate. The hologram recording plate 10 has a three-layer structure comprising a transparent electrically conductive layer 12 formed on a transparent supporting body 11, a transparent photoconductor layer 13 formed on the conductive layer 12, and a transparent plastic layer 14 formed on the photoconductor layer 13. An electrode terminal 15 is provided on part (the end portion) of the conductive layer 12. A glass plate is used as a transparent supporting body 11.

In general, indium oxide—tin oxide (ITO), tin oxide—antimony oxide (ATO) or fluorine-doped tin oxide (FTO) is used as the transparent conductive layer 12.

The photoconductor layer 13 is formed by coating the conductive layer 12 with poly(N-vinylcarbazole), poly(N-vinylcarbazole) derivative, poly(9-vinylanthracene) or poly[9-(P-vinylphenyl)anthracene] to a film thickness of 1–3 $\mu$m. It is preferred that poly(N-vinylcarbazole), in which 2,4,7-trinitro-9-fluorenone has been mixed at a weight ratio of about 10:1, be used as a sensitizing agent.

The plastic layer 14 is formed by coating the photoconductor layer 13 with an ester of rosin, a hydrogenated ester of rosin, an ester of polymerized rosin, a hydrogenated ester of polymerized rosin or polystyrene to a thickness of 0.1–1 $\mu$m. It is preferred that a glycerol ester (glycerin ester) of partially hydrogenated rosin, a pentaerythritol ester of partially hydrogenated rosin, a glycerol ester of completely (or fully or perfectly) hydrogenated rosin or a pentaerythritol ester of completely hydrogenated rosin be used as the material of the plastic layer. Those among these that provide the highest diffraction efficiency are the glycerol ester of completely hydrogenated rosin or the glycerol ester of partially hydrogenated rosin.

Figure 2:
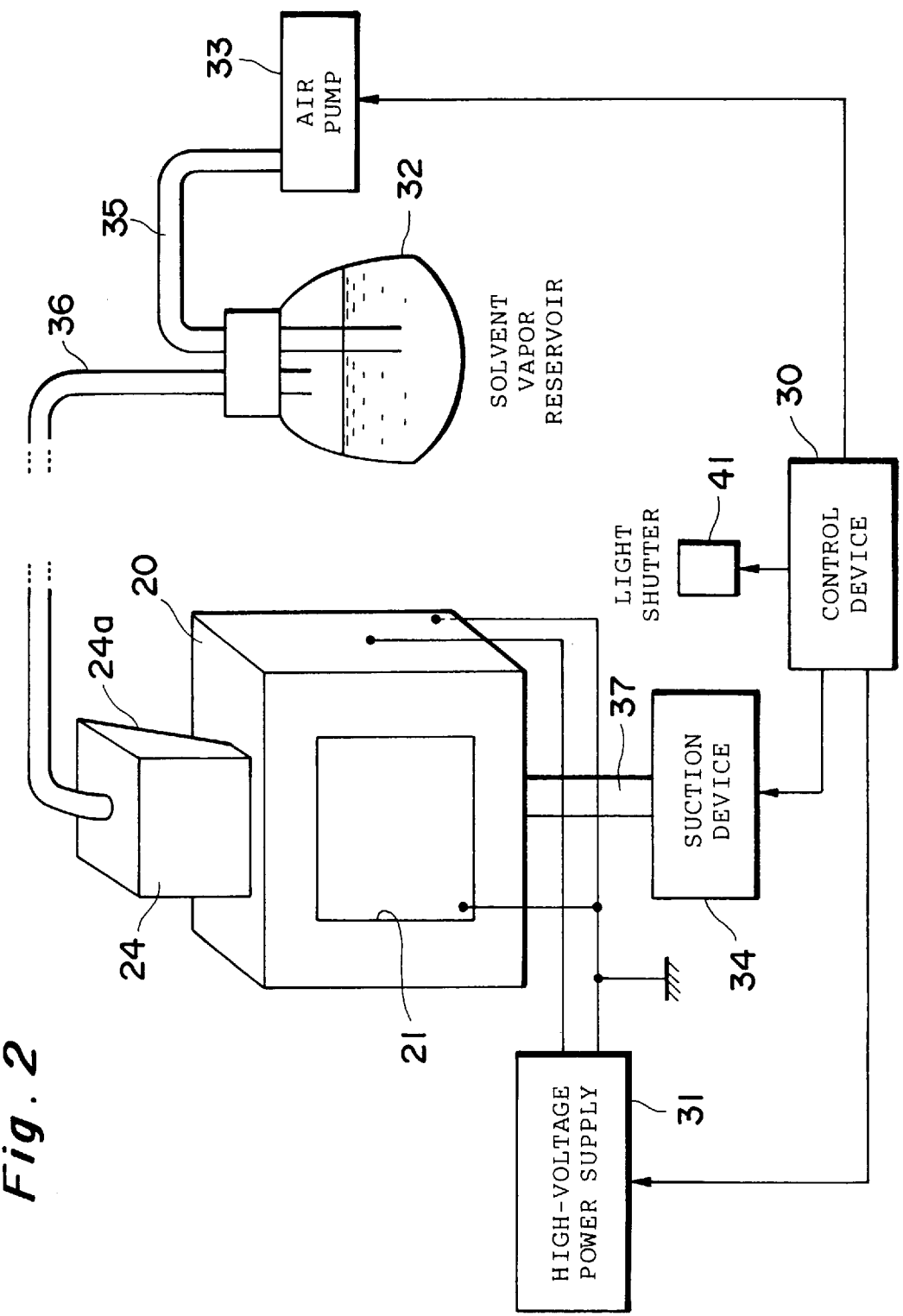
FIG. 2 is a diagram showing the configuration of a system for producing a hologram.
Figure 3:
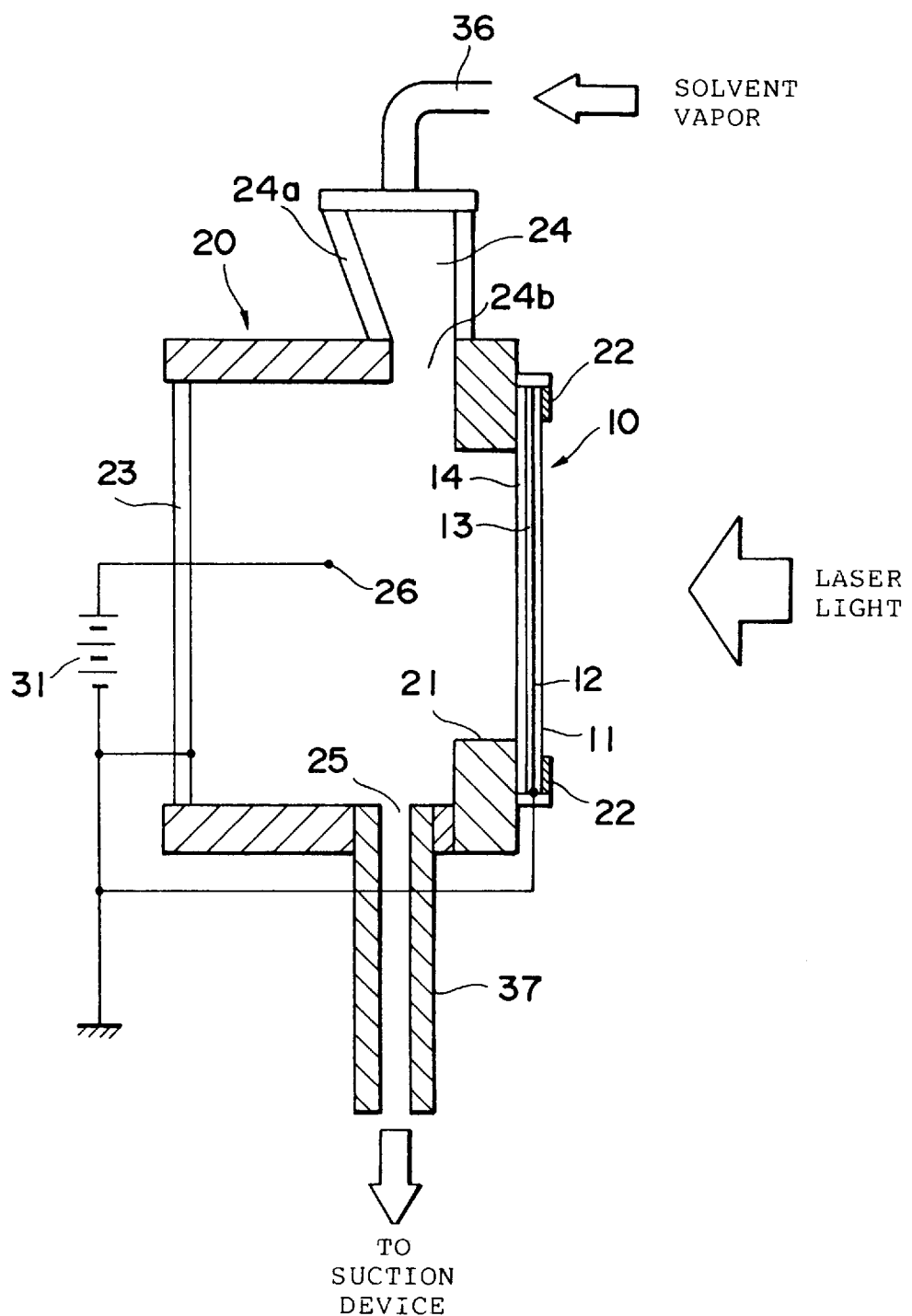
FIG. 3 is a sectional view illustrating a developing box.

FIGS. 2 and 3 illustrate a system for producing a hologram using the hologram recording plate described above.

The hologram producing system includes a developing box 20, one side of which has an opening 21. This side of the developing box 20 is provided with slide rails 22 at positions above and below the opening 21. The hologram recording plate 10 is inserted into the slide rails 22 from one side thereof in such a manner that the plastic layer 14 faces the interior of the box 20. The hologram recording plate 10 is positioned so as to close the opening 21. It is preferred that the developing box 20 be provided beforehand with a fastening member for securely fastening the positioned hologram recording plate 10. By way of example, a stainless steel leaf spring that will not rust may be used as the fastening member. This generally V-shaped leaf spring is provided so as to project slightly into the slide rails 22. When the hologram recording plate 10 is inserted into the slide rails 22, the plate 10 is contacted by the leaf spring and secured facing the interior of the box. Alternatively, strong, delustered stainless steel leaf springs are attached above and below (and on the left and right sides if necessary) of the slide rails 22 on the outer side thereof, and the hologram recording plate 10 is securely fixed by these leaf springs.

The side of the developing box 20 opposite the opening 21 has an opening that is closed by a transparent electrode plate 23. The latter is obtained by forming a transparent electrode layer (consisting of the aforesaid ITO, ATO or FTO, etc.) on a glass plate, with the transparent electrode layer being so disposed as to face the interior of the developing box 20.

The top side of the developing box 20 has a solvent-vapor introduction port 24b, and the bottom side has a suction port 25. A solvent-vapor introduction space 24 is formed at the upper portion of the introduction port 24b by a box. The box has a side wall 24a inclined toward the hologram recording plate 10.

The hologram producing system is further provided with a device for generating solvent vapor. This device includes a solvent vapor reservoir 32 and an air pump 33.

An organic solvent having a boiling point of 20°–150° C. is used as the solvent. Solvents which provide a large diffraction efficiency are hydrocarbons such as cyclohexane and n-hexane or alkyl halides such as carbon tetrachloride and chloroform. The hydrocarbon solvents are suitable from the standpoint of the value of the diffraction efficiency, the optimum acting time of the solvent vapor and the effect upon the environment. Among these hydrocarbon solvents, cyclohexane is best.

When air from an air pump 33 is introduced into the solvent vapor reservoir 32 through an air introduction pipe 35, the solvent vapor is generated and is supplied into the developing box 20 from the solvent-vapor introduction port 24 through a solvent vapor introduction pipe 36. The solvent vapor flows along the inclined wall 24a and uniformly contacts the surface of the plastic layer 14 of the hologram recording plate 10 while flowing along the surface.

It is preferred that a suction device 34 be provided. The suction device 34 is connected to a suction port 25 of the developing box 20 through a suction pipe 37. Solvent vapor that has been fed into the developing box 20 along the above-mentioned flow path is drawn out by the suction device 34 while uniformly contacting the surface of the plastic layer 14 of the hologram recording plate 10. The solvent vapor within the developing box 20 is eventually removed completely by the suction device 34.

A high-voltage power supply 31 generates a high voltage of several kilovolts. Tungsten wire 26 is stretched across the interior of the developing box 20 at a position approximately midway between the hologram recording plate 10 and the transparent electrode plate 23 at a height which corresponds to the approximate centers of these plates. The tungsten wire 26 extends horizontally and parallel to the hologram recording plate 10 and transparent electrode plate 23. The positive side of the high-voltage power supply 31 is connected to the tungsten wire 26, and the negative side is connected to the electrode terminal 15 of the transparent conductive layer 12 of the hologram recording plate 10 and to the transparent electrode plate 23.

A control device 30 produces control signals for controlling the starting and stopping of the air pump 33, controlling the starting and stopping of the suction device 34, controlling the timing at which the high-voltage power supply 31 generates high voltage, and controlling a light shutter 41. The control device 30 is implemented by hardware circuitry which includes a timer circuit or by a microcomputer and its interface circuits. It goes without saying that the operating time of the air pump 33, the operating time of the suction device 34, the high-voltage generation time and the release time of the light shutter 41 can be adjusted at will.

Figure 4:
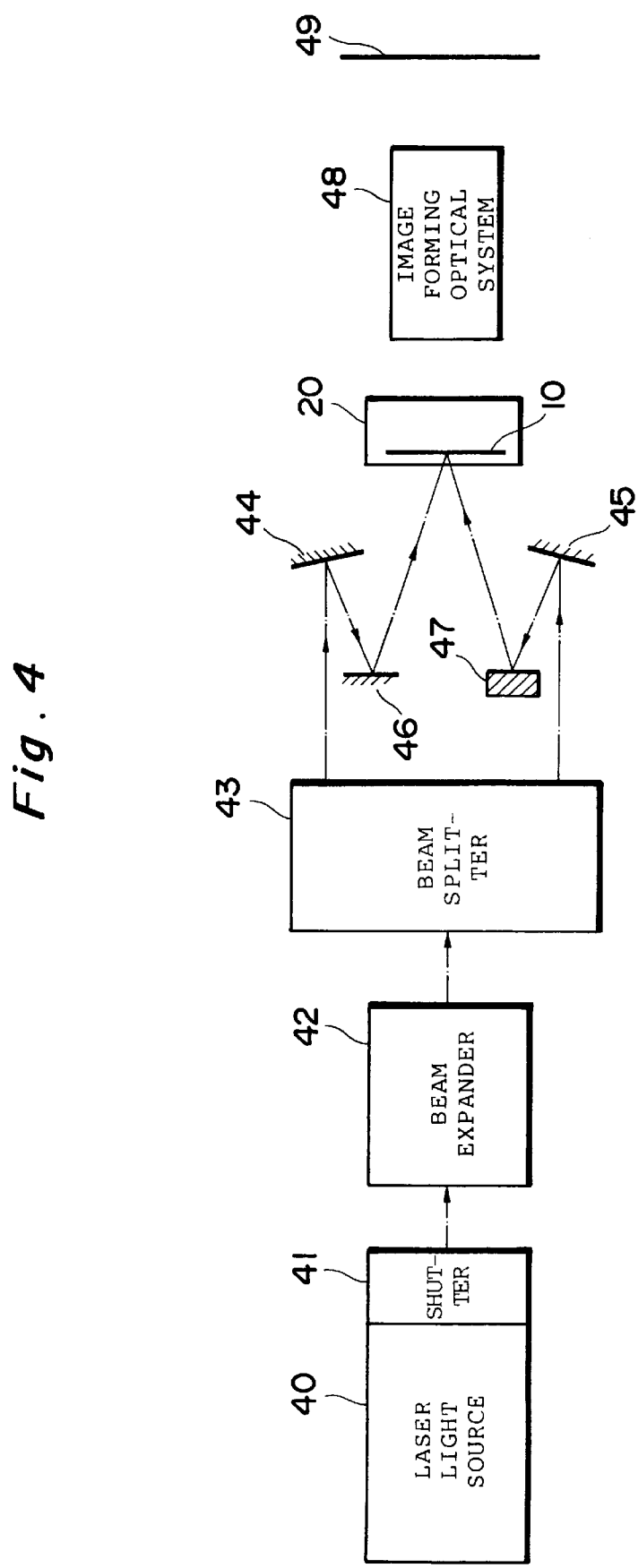
FIG. 4 is a diagram showing the optical system of the system for producing a hologram.

FIG. 4 shows an example of an optical system for producing a hologram using the hologram producing system described above.

Laser light emitted by a laser light source 40 passes through the light shutter 41 and impinges upon a beam expander 42 when the light shutter 41 is open. The beam expander 42 expands the beam diameter of the incident laser light beam and collimates the beam. The laser light of expanded beam diameter is split into two parallel laser light beams by a beam splitter 43.

One of the split laser light beams is reflected by reflecting mirrors 44 and 46 and irradiates the hologram recording plate 10 of the developing box 20. This laser light beam serves as a reference beam. The other laser light beam is reflected by a reflecting mirror 45, this reflected beam is reflected again by an object 47 and the laser light beam reflected by the object irradiates the hologram recording plate 10. In a case where a transparent object is placed in the optical path of this other laser light beam, the light which passes through this object impinges upon the hologram recording plate 10. (These reflected and transmitted laser light beams shall be referred to collectively as "object light" below.) The reference light and the object light interfere and produce interference fringes at the location of the hologram recording plate 10. The interference fringes are recorded on the hologram recording plate 10 in a manner described below. This is the construction of a hologram.

If, after the hologram has been constructed, the object light is shielded and only the reference light irradiates the hologram recording plate 10 with the hologram recording plate 10 being left at the position at which the hologram was constructed in the developing box 20, the hologram will be reconstructed. More specifically, if the hologram recording plate 10 is viewed from the opposite side of the developing box 20 (the side of the transparent electrode plate 23), a three-dimensional image is seen at the position where the object was located. Further, if the reference light that has passed through the hologram recording plate 10 is projected upon a screen 49 by an image forming optical system 48, the reconstructed image will appear on the screen 49.

Figure 5:
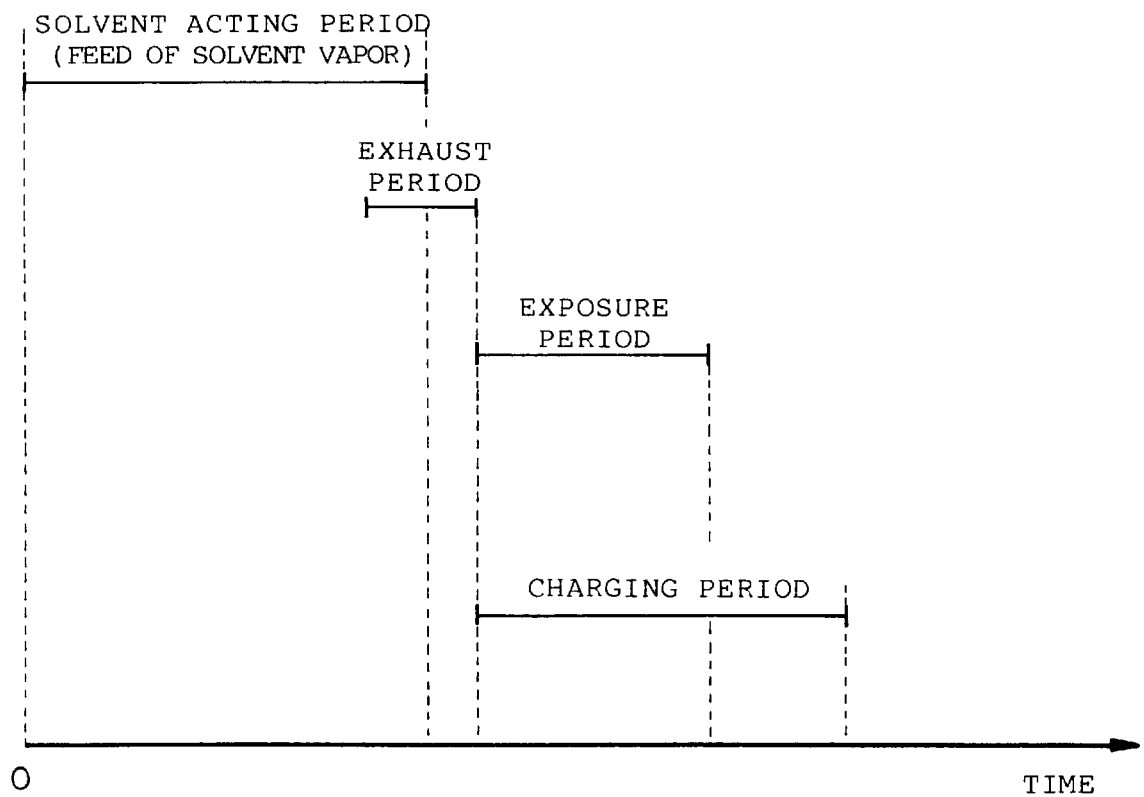
FIG. 5 is a timing chart showing a hologram recording operation.

FIG. 5 illustrates the operation for producing (i.e., photographing) a hologram using the hologram producing system and the optical system described above. This operation is controlled by the control device 30. The light shutter 41 is closed.

The solvent vapor is fed from the solvent reservoir 32 by the air pump 33 and is supplied to the interior of the developing box 20. The solvent vapor atmosphere inside the developing box 20 acts upon the plastic layer 14 of the hologram recording plate 10 uniformly and softens the plastic layer 14 (solvent action period: about 60 s).

The suction device 34 is operated from a point in time slightly earlier than the moment at which the solvent acting period ends, thereby exhausting the solvent vapor from the interior of the developing box 20 (exhaust period: about 15 s). The exhausting of the solvent vapor is continued for a time (about 5 s) beyond the moment at which the supply of the solvent vapor ends. The reason for continuing the exhausting of the solvent vapor slightly beyond the end of supply of the solvent vapor is to hasten and complete the fixing of the hologram on the plastic layer 14. If solvent vapor were to be left inside the developing box 20, the surface of the plastic layer 14 would be kept in the softened state constantly and would not harden. Accordingly, the solvent vapor that has finished softening the surface of the plastic layer 14 is exhausted as rapidly as possible.

After the solvent vapor is exhausted from the interior of the developing box 20, a voltage of several kilovolts is applied across (a) the tungsten wire 26 and (b) the transparent conductive layer 12 of the hologram recording plate 10 and the transparent electrode plate 23 by the high-voltage power supply 31, thereby producing a corona discharge on the surface of the plastic layer 14 (charging period: about 30–50 s). Since the tungsten wire 26 is provided substantially midway between the transparent conductive layer 12 and the transparent electrode plate 23, the surface of the plastic layer 14 is charged substantially uniformly.

The light shutter is released at the same time that the high voltage is applied, thereby irradiating the plastic layer 14 of the hologram recording plate 10 with both the object light and the reference light and producing interference (exposure period: about 10–30 s). Since the photoconductor layer 13 conducts where light strikes it, migration of charge occurs and the surface of the plastic layer 14 undergoes frost deformation owing to the attracting effect of electric charge. As a result, interference fringes corresponding to the intensity of light are recorded as surface roughness. The application of high voltage is continued for a time beyond the end of exposure by the interfering light.

A hologram is thus photographed and recorded on the recording plate 10.

The hologram thus produced can be completely erased (i.e., the surface roughness can be made to disappear) by again causing the solvent vapor to act upon the plate. A different image can be recorded anew on the plate from which the hologram has been erased. In other words, the hologram recording plate can be used repeatedly.

By leaving the recording plate 10 bearing the recorded hologram mounted in the developing box 20 and then irradiating the plate with the reference light, the hologram can be reconstructed.

Thus, a hologram recording plate is placed in the holographic optical system in order to undergo hologram photography, the plate is developed at this position and the hologram is reconstructed at this position. Unlike the conventional method in which a photographic plate is used, the plate need not be removed for the purpose of exposure and it is possible to produce a hologram rapidly and automatically in situ. The apparatus can be made small in size since there is no need for a complicated, large-scale mechanism such as a high-frequency heating apparatus for thermally fusing a plastic layer. The sensitivity of the plastic layer is excellent to the extent that a hologram can be produced even by weak light (an He-Ne laser) on the order of 4 $\mu$m/cm$^2$.

Figure 6:
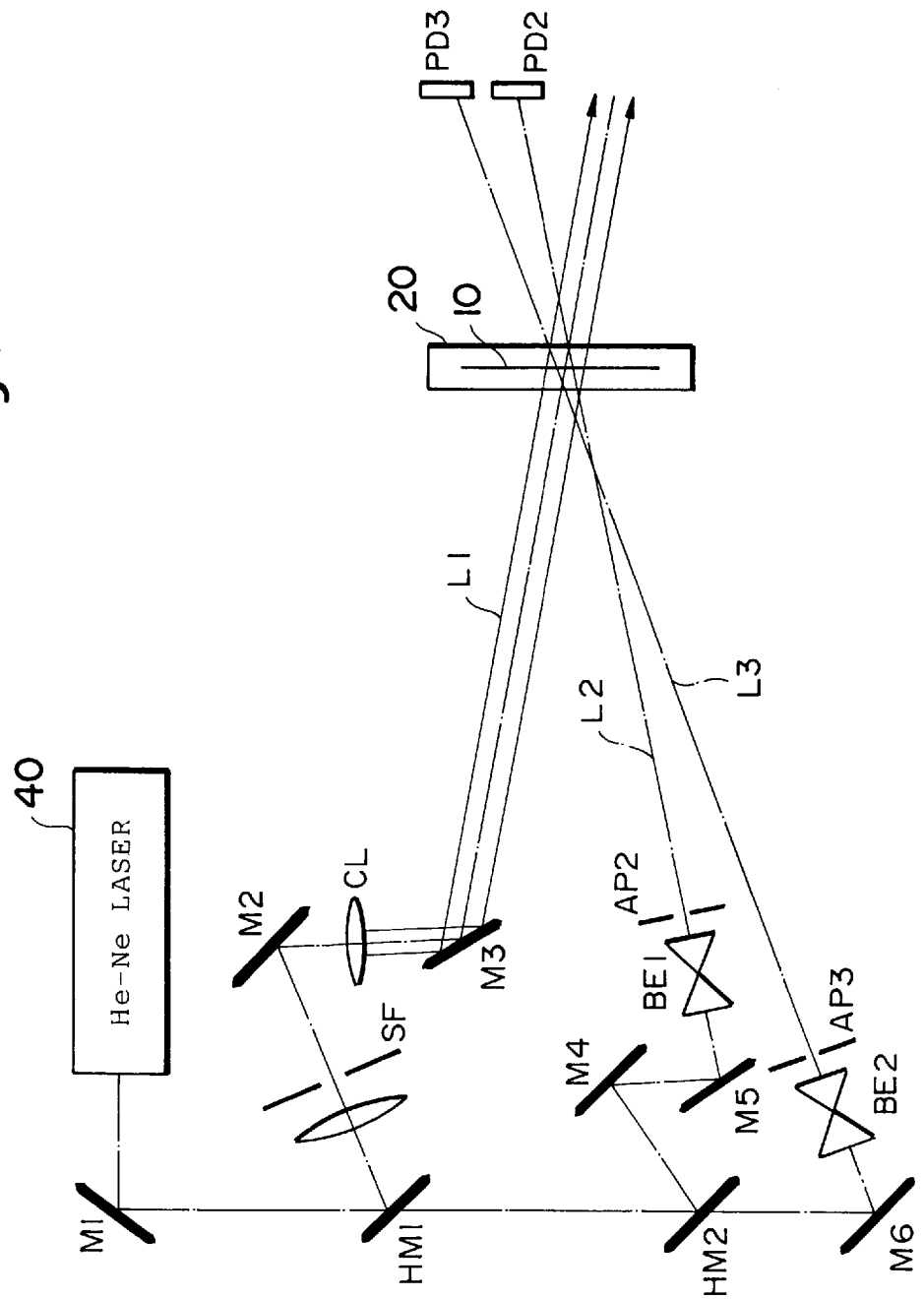
FIG. 6 is a diagram showing an optical system used in an experiment for measuring diffraction efficiency.

FIG. 6 is a diagram showing an optical system used to evaluate the production of a hologram. The developing box 20 and the hologram recording plate 10 are shown schematically.

The light source 40 is an He-Ne laser having a wavelength of 632.8 nm. The laser light from this He-Ne laser 40 irradiates the hologram recording plate 10 as reference light L1 via a mirror M1, half-mirror HM1, spatial filter SF, mirror M2, collimator/lens CL and mirror M3.

Experiments can be performed at two different angles of intersection (number of interference fringes) with this optical system. This is because the diffraction efficiency of a hologram is considered to differ depending upon the number of interference fringes of the hologram. Object light L2 is used on the one hand and object light L3 on the other. One of these object light beams is employed and the other is shielded by a light shielding plate (not shown).

The He-Ne laser light is rendered into the object light L2 via the mirror M1, the half-mirror HM1, a half-mirror HM2, a mirror M4, a mirror M5, a beam expander BE and an aperture plate (having an aperture diameter of 7 mm) AP2. (The angle defined by the object light and reference light beams is 29.3°, and the spatial frequency which is equal to the number of interference fringes is 800 lines/mm.)

The other object light beam L3 branches from the half-mirror HM2 and is produced by a mirror M6, a beam expander BE2 and an aperture plate (having an aperture diameter of 7 mm) AP3. (The angle defined by the object light and reference light beams is 36.8°, and the number of interference fringes is 1000 lines/mm.)

Photodetectors PD2, PD3 are placed on extensions of the object light beams, respectively.

The reference light beam L1 and either the object light beam L2 or L3 are used when a hologram is produced. As a result, a hologram having the shape of a diffraction grating is captured on the hologram recording plate 10.

When the hologram is reconstructed, the hologram recording plate 10 is irradiated solely with the reference light beam L1.

At reconstruction of the hologram, the intensity of diffracted light is measured by the photodetector PD2 or PD3 and the diffraction efficiency is calculated based upon the intensity measured.

Diffraction intensity is defined as $(I/I_R) \times 100$, where $I_R$ represents the intensity of the reference light and I the intensity of the reproduced light obtained by irradiation with the reference light.

Hologram recording plates were made while changing the type of plastic layer, which is one of the constituents of the photosensitive material for the hologram, the type of solvent vapor used to produce a hologram was changed with regard to each of these hologram recording plates to measure the diffraction efficiencies. The results of these measurements are as shown in Table 1. An He-Ne laser (having a wavelength of 633 nm and producing vertically polarized light at output) was used as the light source, and the angle between the object light beam and reference light beam was set at 36.8° (spatial frequency=1000 lines/mm).

The material of the photoconductor layer was a mixture of PVK and TNF (10:1). The solvent acting period was 40 s.

TABLE 1

HOLOGRAM DIFFRACTION EFFICIENCY BY TYPE OF PLASTIC LAYER AND TYPE OF SOLVENT VAPOR

| | | Diffraction Efficiency (%) Solvent Vapor | | | | |
|---|---|---|---|---|---|---|
| Example | Plastic Layer | A | B | C | D | E |
| 1 | Glycerol ester of completely hydrogenated rosin (Foral 85)* | 27 | 7 | 0 | 0 | 0 |
| 2 | Pentaerythritol ester of completely hydrogenated rosin (Foral 105)* | 12 | 3 | 0 | 0 | 0 |
| 3 | Glycerol ester of parially hydrogenated rosin (Staybelite Ester 5J)* | 25 | 7 | 0 | 0 | 0 |
| 4 | Pentaerythritol ester of partially hydrogenated rosin (Pentalyn H)* | 4 | 1 | 0 | 0 | 0 |
| 5 | Glycerin ester of rosin (Ester Gum 8D)* | 5 | 2 | 0 | 0 | 0 |
| 6 | Pentaerythritol ester of rosin (Pentalyn A-JA)* | 2 | 0 | 0 | 0 | 0 |
| 7 | Glycerol ester of dispropor- tionated rosin (Super Ester A-75)** | 27 | 8 | 0 | 0 | 0 |

A: cyclohexane; B: n(normal)-hexane; C: methanol; D: acetone; E: diethyl ether
*Manufactured by Rika Hercules K.K.
**Manufactured by Arakawa Chemical Inc.

The plastic layers of Examples 1 through 6 are all rosin derivatives. As for the solvent vapor, cyclohexane has the best compatibility with respect to these plastic layers and is preferred for practical use. Table 1 shows that n-hexane can also be employed as the solvent vapor with good practical results.

EXAMPLE 1

The hologram recording plate (photoconductor layer and layer of plastic photosensitive material) of Example 1 was fabricated in the following manner:

ITO glass (10 Ω/□) was coated, to a film thickness of about 2 $\mu$m, with poly(N-vinylcarbazole) (PVK) and 2,4,7-trinitro-9-fluorenone (TNF) mixed together at a weight ratio of 10:1 to form the photoconductor layer. The photoconductor layer was coated with Foral 85 (a plastic photosensitive material) to a film thickness of 0.3 $\mu$m to form the plastic layer. The photoconductor was dissolved in a mixed solvent of toluene and nitrotoluene, the plastic photosensitive material was dissolved in benzene, and then each of these layers was formed by spin coating.

Next, the hologram recording plate was set in the developing box of the hologram producing system shown in FIG. 2, interference fringes were recorded on the plate and then the diffraction efficiency was measured. The plastic layer was softened by being exposed, for a period of more than 40 s, to the vapor of cyclohexane supplied from the solvent vapor generating device. The solvent vapor was then drawn off by the suction device. Five seconds after the supply of the solvent vapor was stopped, a voltage of 5 kV was applied across the plastic layer and the tungsten wire to produce a corona discharge (for 50 s) and, at the same time, the plastic layer was exposed to light for 10 s.

After the diffraction grating was thus recorded on the hologram recording plate, the diffraction efficiency was measured and found to be 27% (see Table 1). The experiment was performed upon changing the periods of time during which the solvent vapor was allowed to act from 40 s to 30 s and 60 s, but substantially the same values were obtained.

It was verified by the experimental results that a perfect hologram could be obtained at a total of 4 $\mu$W with object light of 2 $\mu$W and reference light of 2 $\mu$W using an He-Ne laser, and it was clarified that sensitivity was much higher in comparison with the conventional thermoplastic method.

As the result of performing the same measurements using n-hexane, methanol, acetone and diethyl ether as the solvent vapor, it was found that the diffraction efficiency was 7, 0, 0, 0%, respectively (as shown in Table 1).

EXAMPLES 2–6

In Examples 2 through 6, hologram recording plates where fabricated in the same way as in Example 1 while changing the photosensitive material of the plastic layer, and diffraction efficiency was measured while changing the type of solvent vapor using an optical system the same as that used in Example 1. The results are as shown in Table 1.

Using a light source having a short wavelength, such as an Ar laser having a wavelength of 488 nm, provides a high energy efficiency, affords good efficiency in terms of sensitivity and results in a very high diffraction efficiency. When diffraction efficiency was actually measured using an Ar laser, the results obtained indicated a very high diffraction efficiency and a high hologram sensitivity.

The method of recording a hologram described above surpasses the conventional method of using a silver halide photosensitive material in terms of its high diffraction efficiency, high sensitivity, spontaneity and reversibility. Accordingly, the inventive method is capable of being applied to a system for spontaneously recognizing the minute vibration or change in shape of an object, as well as patterns and characters. For example, the inventive method is applicable to inspections of the external appearance of mounted PC boards.

Further, since the hologram producing system described above is such that the hologram recording plate can be developed in place, the system is extremely effective for use in a hologram real-time interference method. This paves the way for more generalized use of real-time holography such as for use in measuring modes of vibration, visualizing of flow, etc..

Furthermore, there is no need for comparatively large-size, complicated electronic equipment for thermal fusion, as is required in methods that rely upon thermoplastic. This makes it possible to reduce the size and raise the precision of the developing apparatus. The simplicity and high precision of this automatic hologram producing apparatus together with the high speed thereof make the apparatus suitable for use as a teaching aid for junior high school and high school students. Further, the invention paves the way for easier use of holograms as a tool for research and development by university students and technicians in general.

Furthermore, a high-performance hologram can be produced in simple fashion by a low-power (5 mW) He-Ne laser that is generally available at low cost. This contributes to broader application of holographic techniques.

FIGS. 7 through 10 illustrate an optical system for producing a hologram.

A single rail 110 for aligning an optical system serves as a foundation for supporting the entirety of the optical system that produces the hologram. The rail 110, which consists of a metal such as aluminum, is formed to be linear. The length of the rail 110 is 1500 mm, by way of example.

Figure 10:
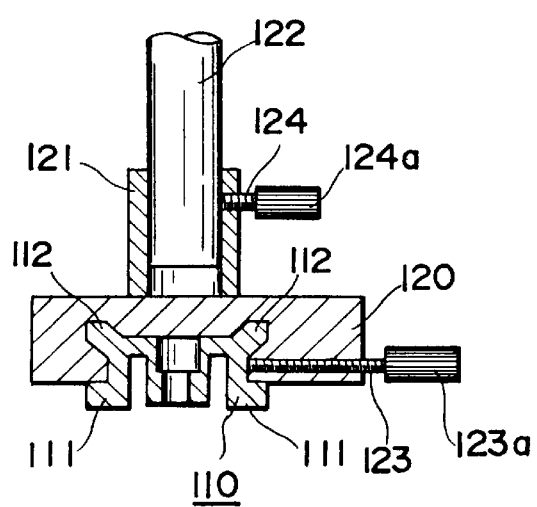
FIG. 10 is an enlarged sectional view of the rail.

Flanges 111 are formed along both sides of the rail 110 on the lower edges thereof. (The structure of the rail 110 is best shown in FIG. 10). Longitudinally extending grooves are formed in the underside of the rail 110, with the remaining part of the underside being flat. Flanges 112 projecting upward somewhat obliquely are formed on both sides of the rail 110 on the upper portion thereof longitudinally of the rail 110. The top side of the rail 110 also is flat between the flanges 112.

All of the optical elements (described in detail below) which construct the optical system for producing the hologram are fixedly secured to and supported on the rail 110. Accordingly, the optical relationship among the optical elements assembled on the rail 110 will not change even if the rail 110 vibrates. Further, even if the rail 110 is disposed at a slight incline, this will have no adverse effect upon the optical system arranged on the rail 110. The optical system for producing the hologram can also be moved to another location by carrying the rail 110 to that location.

Carriers 120 are used to secure the optical elements of this optical system to the rail 110. The underside of each carrier 120 is formed to have a recess of a shape in which the upper half of the rail 110 will just fit. The recess is engaged with the upper half of the rail 110 in freely slidable fashion to that the carrier 120 can be moved along the rail 110.

Each carrier 120 has a female threaded hole extending toward the rail 110 from one side of the carrier, and a fixing screw 123 is screwed into this hole. The outer end of the fixing screw 123 is provided with a knob 123a. Loosening the fixing screw 123 frees the carrier 120 to allow it to be moved along the rail 110. Tightening the fixing screw 123 makes it possible to fixedly secure the carrier 120 to a desired position on the rail 110.

A rod stand 121 is vertically erected on each carrier 120 and is a cylindrical body. The rod stand 121 preferably is secured to the carrier 120 (as by welding). It is of course possible to arrange it so that the rod stand 121 can be separated from the carrier 120.

A rod 122 is inserted into a hole in each rod stand 121 in such a manner that the rod may be withdrawn freely. Various optical elements are provided on the upper portions of the rods 122. A diametrically extending female threaded hole is drilled in the peripheral wall of each rod stand 121, and a fixing screw 124 is screwed into this hole. The outer end of the fixing screw 124 is provided with a knob 124a.

Loosening the fixing screw 124 frees the rod 122 so that the rod may be moved up and down within the stand 121. Tightening the fixing screw 124 fixedly secures the rod 122. As a result, an optical element provided on the rod 122 can be adjusted to a desired height.

The hologram producing optical system assembled on the rail 110 and the various optical elements constructing this optical system will now be described.

The light source is an He-Ne laser 130, by way of example. The laser 130 is fixed to one of the rods 122 by a circular holder 126. The laser 130 preferably is provided with a light shutter (a light shutter 139, described later). The laser 130 emits coherent collimated luminous flux having a beam diameter on the order of 1 mm.

The head of the laser 130 is provided with a beam expander (luminous flux expander) 131 by which the laser beam is made an expanded collimated beam having a diameter on the order of 5 mm.

A concave lens 132 and a convex lens 133 are provided in front of the laser 130. The concave lens 132 and convex lens 133 are fixed to respective rods 122 supported on the stands 121 secured to the rail 110.

The concave lens 132 enlarges the luminous flux of the laser beam. The convex lens 133, which is placed at a position where its front focal point coincides with the front focal plane of the concave lens 132, converts the luminous flux enlarged by the concave lens 132 to collimated light. The luminous flux is enlarged by these two lenses 132, 133 so as to have a diameter which is about 7.5 times larger (i.e., a flux diameter of about 37 mm).

Thus, beam-shaping system in which the luminous flux of the laser light emitted by the laser 130 is expanded and collimated is constructed by the beam expander 131, the concave lens 132 and the convex lens 133.

The laser light whose luminous flux has been enlarged impinges upon a beam-splitter optical system 140. The latter is placed on a flat plate 141, which is supported by supporting arms 125 provided on one of the carriers 120 secured to the rail 110.

In the beam-splitter optical system 140, the luminous flux is split into two luminous fluxes of substantially equal light intensities by a half-mirror (semi-transparent mirror) 142. One of these split luminous fluxes is reflected by a total reflecting mirror 143 and serves as reference light. The other luminous flux is reflected by total reflecting mirrors 144 and 145 and serves as object light. (Strictly speaking, reflected light from an object or light that has passed through the object is referred to as object light. Here, however, light before it has irradiated the object is also referred to as object light in order to distinguish it from the reference light.) The reference light beam and object light beam are parallel to each other. The total reflecting mirrors 143, 144 and 145 also are provided on the flat plate 141.

A filter holder 146 also is provided on the flat plate 141 of the beam-splitter optical system 140. An extinction filter is placed on the filter holder 146 if necessary. The extinction filter adjusts the light intensity of the reference light so as to substantially equalize the intensities of the reference light and object light, thereby heightening the contrast of the interference fringes formed on a hologram recording plate, which is described later.

An interference optical system 150 and the developing box 20 are situated in front of the beam-splitter optical system 140 in the order mentioned. The developing box 20 is provided with the hologram recording plate 10.

It is assumed that the hologram producing optical system of this embodiment provides a three-dimensional image based upon reflected light from an object 153.

The reference light is reflected by total reflecting mirrors 155 and 152 and strikes the hologram recording plate 10. The object light is reflected by a total reflecting mirror 156 and is then reflected by the object 153. The reflected light from the object strikes the hologram recording plate 10. The reference light beam and reflected object light beam produce interference fringes at the position of the hologram recording plate 10, and the interference fringes are recorded on the hologram recording plate 10. A hologram is thus produced.

If a transmission object is placed in the optical path of the object light and the light that has passed through the object strikes the hologram recording plate 10, then a hologram representing the three-dimensional image of the object resulting from the transmitted light will be obtained. More specifically, it will suffice to place a total reflecting mirror at the position of the object 153 and place the transmission object between this total reflecting mirror and the total reflecting mirror 156 or hologram recording plate 10.

The total reflecting mirrors 155 and 156 are secured to a supporting plate 154. The latter also is supported on one of the rods 122, which is carried on one of the stands 121 of the respective carrier 120 secured to the rail 110.

The total reflecting mirror 152 and the object 153 are placed on a sample holder 151. The latter also is attached to one of the rods 122, which is supported by one of the stands 121 of the respective carrier 120 secured to the rail 110.

An image forming lens 191 and a screen 192 are placed farther ahead in front of the developing box 20. The image forming lens 191 and screen 192 are also supported by respective carriers 120, stands 121 and rods 122 freely movable along the rail 110.

If, after the hologram has been constructed, the object light is blocked and only the reference light irradiates the hologram recording plate 10 with the hologram recording plate 10 being left at the position at which the hologram was constructed in the developing box 20, the hologram will be reconstructed. More specifically, if the hologram recording plate 10 is viewed from the opposite side of the developing box, a three-dimensional image is seen at the position where the object was located. Further, if the object light reproduced by irradiating the hologram recording plate 10 with the reference light is projected upon the screen 192 by the image forming lens 191, then the reconstructed image will appear on the screen 192.

The light beam that has passed through or been reflected by the optical elements from the laser 130 to the screen 192 can be made parallel to the rail 110 by adjusting the height of these optical elements.

The optical system on the rail 110 is entirely independent of external circumstances. There is absolutely no need to place the rail 110 on an optical bench or isolation table having a vibration-proof structure. An excellent hologram is obtained merely by placing the rail 110 on a wooden desk and securing the rail 110 at several locations using vinyl tape. Thus, the hologram producing optical system on the rail 110 is vibration proof and highly stable.

The structure of the hologram recording plate 10 and the construction of the hologram using the developing box 20 have already been described with reference to FIGS. 1–3 and FIG. 5.

Since the devices other than the developing box 20 in the above-described hologram producing system (namely the control device 30, high-voltage power supply 31, solvent vapor reservoir 32, air pump 33 and suction device 34) are not included in the optical system, there is absolutely no need to place these on the rail 110. These devices may be connected to the developing box 20 by electrical cables or piping.

Since it is possible to make the developing box 20 small in size, the developing box 20 can be secured to the single rail 110 along with the optical elements of the hologram producing optical system so that the construction and reconstruction of the hologram can be performed at a single stroke.

The hologram producing optical system described above is capable of recording a hologram at the position at which the hologram recording plate is set (in the case of the conventional photographic plate, for example, it is necessary to remove the plate after photography and then develop the plate at another location), the optical system can be used in real-time holographic interferometry and is effective as a means of performing real-time measurement of the vibration and strain of an object. Real-time holographic interferometry refers to a method of subjecting a hologram to object light and reference light and observing, in real-time, the interference between the present object light and original object image reconstructed by the reference light.

Figure 7:
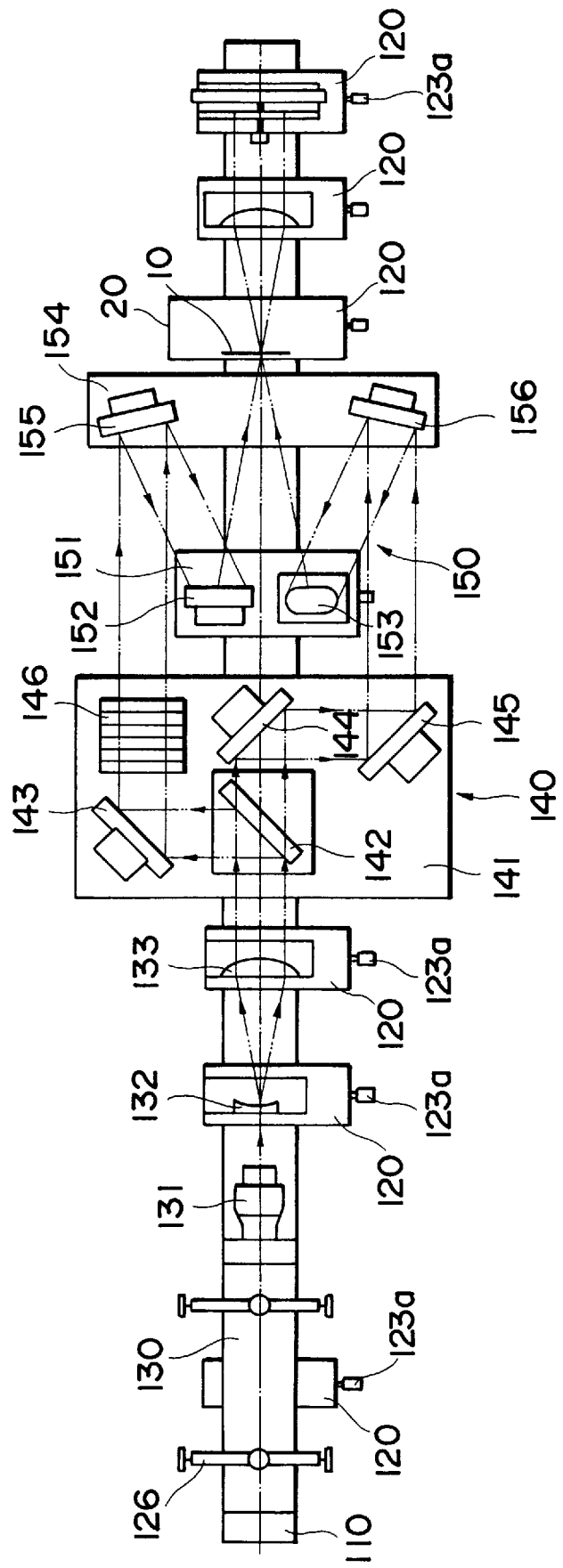
FIG. 7 is a plan view illustrating an optical system for producing a hologram.
Figure 8:
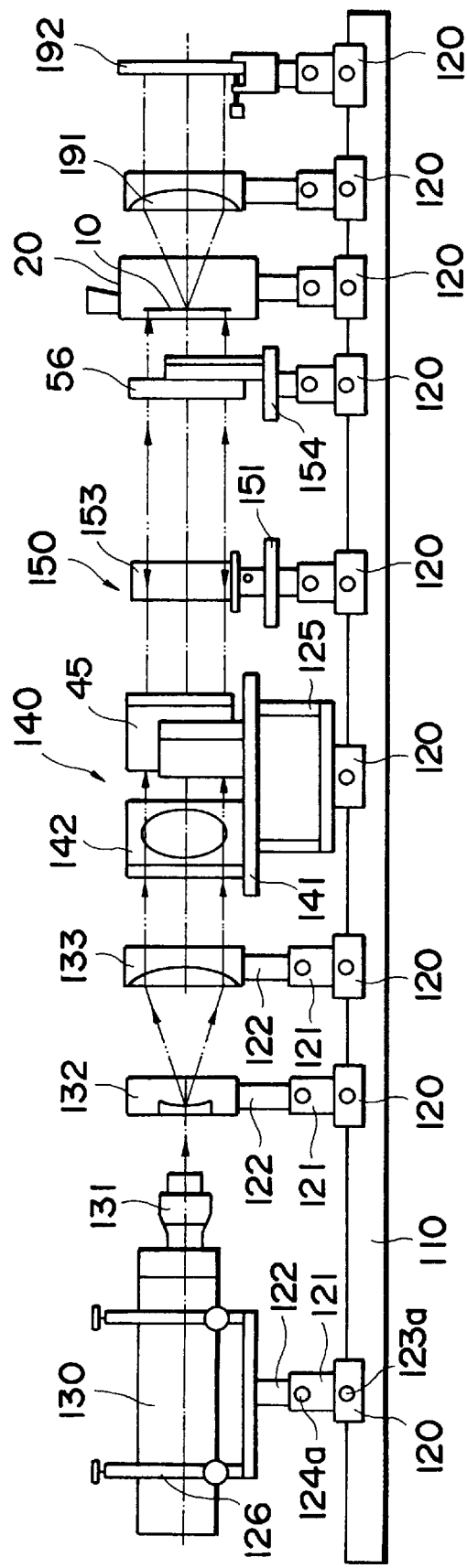
FIG. 8 is a side view showing the optical system for producing a hologram.
Figure 9:
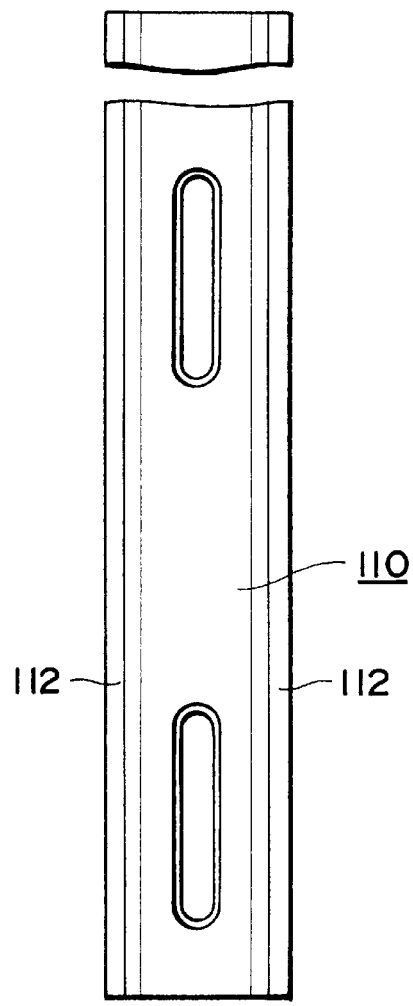
FIG. 9 is an enlarged plan view of a rail.

The optical system set up on the single rail as shown in FIGS. 7 and 8 can be used in various applications other than in hologram construction.

This optical system can be used in sophisticated technical research and development. By way of example, if a lens system for producing a matched filter having two concave lenses and one object holder is placed between a sample holder 151 and a developing box 20 and a transmission hologram is constructed in place, then this hologram will be a matched filter. This may be utilized in object shape recognition, character-string recognition and in various experiments such as external inspections of mounted PC boards and makes it possible to develop modern optical computing techniques. The inventive optical system is useful in conducting research and development of such sophisticated techniques.

An example of a simple optical experiment is to place a total reflecting mirror at the location of the object on the sample holder 151 and cause two luminous fluxes to interfere at the position of the developing box 20 (which has been removed). This makes it possible to carry out an ordinary interference experiment. A diffraction experiment may also be conducted by interposing a pin hole or character shape or the like in one of the two luminous fluxes. Furthermore, an imaging experiment using lenses may be performed in simple fashion in this optical system.

The optical system described above makes it possible for ordinary individuals to acquire, simply and inexpensively, the sophisticated techniques necessary for holography and the like. More specifically, the above-described optical system can be utilized as a teaching aid for high school and junior high school students, as a teaching aid for university students and ordinary technicians, and as a sophisticated R & D tool for real-time visualization and measurement of vibration/strain and instantaneous recognition of plural object shapes and character strings, and in the development of eyes for intelligent robots.

As many apparently widely different embodiments of the present invention can be made without departing from the spirit and scope thereof, it is to be understood that the invention is not limited to the specific embodiments thereof except as defined in the appended claims.

What is claimed is:

1. A hologram recording apparatus comprising:
   a developing box for holding a hologram recording plate in a freely attachable and detachable manner, said hologram recording plate having a plastic layer which undergoes frost deformation by being acted upon by solvent vapor;
   a high-voltage application device for applying a high voltage to the hologram recording plate supported by said developing box;
   a solvent vapor generating device for generating a solvent vapor caused to act upon the hologram recording plate supported by said developing box, and feeding the generated solvent vapor into said developing box;
   a suction device for exhausting the solvent vapor that has been fed into said developing box;
   a light shutter device for controlling irradiation of the hologram recording plate with laser light emitted by a laser light source; and
   a control device for controlling said solvent vapor generating device, said suction device, said light shutter device and said high-voltage application device in such a manner that the following process periods are implemented in a predetermined sequence: a solvent acting period in which the solvent vapor is made to act upon the hologram recording plate, an exhaust period in which the solvent vapor is exhausted from said developing box, an exposure period in which the hologram recording plate is irradiated with the laser light, and a charging period in which high voltage is applied to the hologram recording plate.

2. The apparatus according to claim 1, wherein said control device performs control in such a manner that the exhaust period starts prior to end of the solvent acting period and continues for a predetermined period of time after the end of the solvent acting period, and in such a manner that the exposure period and charging period start after the exhaust period ends.

3. The apparatus according to claim 1, wherein the plastic layer of the hologram recording plate includes a hydrogenated ester of rosin and the solvent vapor is cyclohexane or n-hexane.

4. An optical system for producing a hologram using the hologram recording apparatus described in claim 1, comprising:
   a laser light source;
   a beam-shaping optical system for enlarging the beam diameter of and collimating laser light emitted by said laser light source;
   a beam-splitter optical system for splitting laser light, which has been shaped by said beam-shaping optical system, into two light beams;
   an interference optical system for making these two light beams interfere as a reference light beam and an object light beam;
   a hologram producing device for fixing interfering light, which has been produced by said interference optical system, on the hologram recording plate;
   separate carriers on which respective ones of said light source, said optical systems and said hologram producing device are secured; and
   an optical system aligning rail, said carriers being free to move along said rail and capable of being fixed to said rail;
   said developing box being used as said hologram producing device.

5. A method of recording a hologram comprising the steps of:
   setting a hologram recording plate in a developing box, said hologram recording plate having a plastic layer which undergoes frost deformation by being acted upon by solvent vapor;
   supplying said developing box with a solvent vapor;
   exhausting the solvent vapor from said developing box and continuing exhausting of the solvent vapor for a predetermined period of time beyond a point at which supply of the solvent vapor to said developing box is stopped; and
   applying a high voltage to the hologram recording late and irradiating the hologram recording plate with laser light, which represents a hologram to be formed, after exhausting of the solvent vapor from said developing box ends.

6. The method according to claim 5, wherein the plastic layer of the hologram recording plate is formed using a hydrogenated ester of rosin, and cyclohexane or n-hexane is used as the solvent vapor.

7. A hologram recording apparatus comprising:
   an optical system for producing a hologram, comprising:
      a laser light source;
      a beam-shaping optical system for enlarging the beam diameter of and collimating laser light emitted by said laser light source;
      a beam-splitter optical system for splitting the laser light, which has been shaped by said beam-shaping optical system, into two light beams;
      an interference optical system for making these two light beams interfere as a reference light beam and an object light beam;
      a hologram producing device for fixing the interfering light, which has been produced by said interference optical system, on a hologram recording plate;
      separate carriers on which respective ones of said light source, said optical systems and said hologram producing device are secured; and
      an optical system aligning rail, said carriers being free to move along said rail and capable of being fixed to said rail,
      wherein said hologram producing device is a developing box for holding the hologram recording plate in a freely attachable and detachable manner, the hologram recording plate having a plastic layer which undergoes frost deformation by being acted upon by a solvent vapor;
   a high-voltage application device for applying a high voltage to the hologram recording plate supported by said developing box;
   a solvent vapor generating device for generating the solvent vapor caused to act upon the hologram recording plate supported by said developing box, and feeding the generated solvent vapor into said developing box;
   a suction device for exhausting the solvent vapor that has been fed into said developing box;
   a light shutter device for controlling irradiation of the hologram recording plate with the laser light emitted by the laser light source; and
   a control device for controlling said solvent vapor generating device, said suction device, said light shutter device and said high-voltage application device in such a manner that the following process periods are implemented in a predetermined sequence: a solvent acting period in which the solvent vapor is made to act upon the hologram recording plate, an exhaust period in which the solvent vapor is exhausted from said developing box, an exposure period in which the hologram recording plate is irradiated with the laser light, and a charging period in which the high voltage is applied to the hologram recording plate.

8. The apparatus according to claim 7, wherein said control device performs control in such a manner that the exhaust period starts prior to end of the solvent acting period and continues for a predetermined period of time after the end of the solvent acting period, and in such a manner that the exposure period and charging period start after the exhaust period ends.

9. A hologram recording apparatus, comprising:

a developing box for holding a hologram recording plate in a freely attachable and detachable manner, said hologram recording plate having a plastic layer which undergoes frost deformation by being acted upon by solvent vapor;

a high-voltage application device for applying a high voltage to the hologram recording plate supported by said developing box;

a solvent vapor generating device for generating a solvent vapor caused to act upon the hologram recording plate supported by said developing box, and feeding the generated solvent vapor into said developing box; and a suction device for exhausting the solvent vapor that has been fed into said developing box.

10. The apparatus according to claim 9, wherein said developing box is formed with a solvent-vapor introduction port connected to said solvent vapor generating device and a solvent-vapor suction port connected to said suction device, said developing box is further provided with a wall inclined toward the hologram recording plate held in said developing box in the vicinity of said solvent-vapor introduction port.

11. A developing box comprising a hologram recording plate and a mechanism for holding said hologram recording plate in a freely attachable and detachable manner, said hologram recording plate having a plastic layer which undergoes frost deformation by being acted upon by solvent vapor, said developing box comprising a solvent-vapor introduction port connectable to a solvent vapor generating device, a solvent-vapor suction port connectable to a suction device and an inclined wall in the vicinity of said solvent-vapor introduction port for directing the solvent vapor fed from said solvent vapor generating device to said developing box toward the hologram recording plate held in said developing box.

* * * * *